Figure 1:
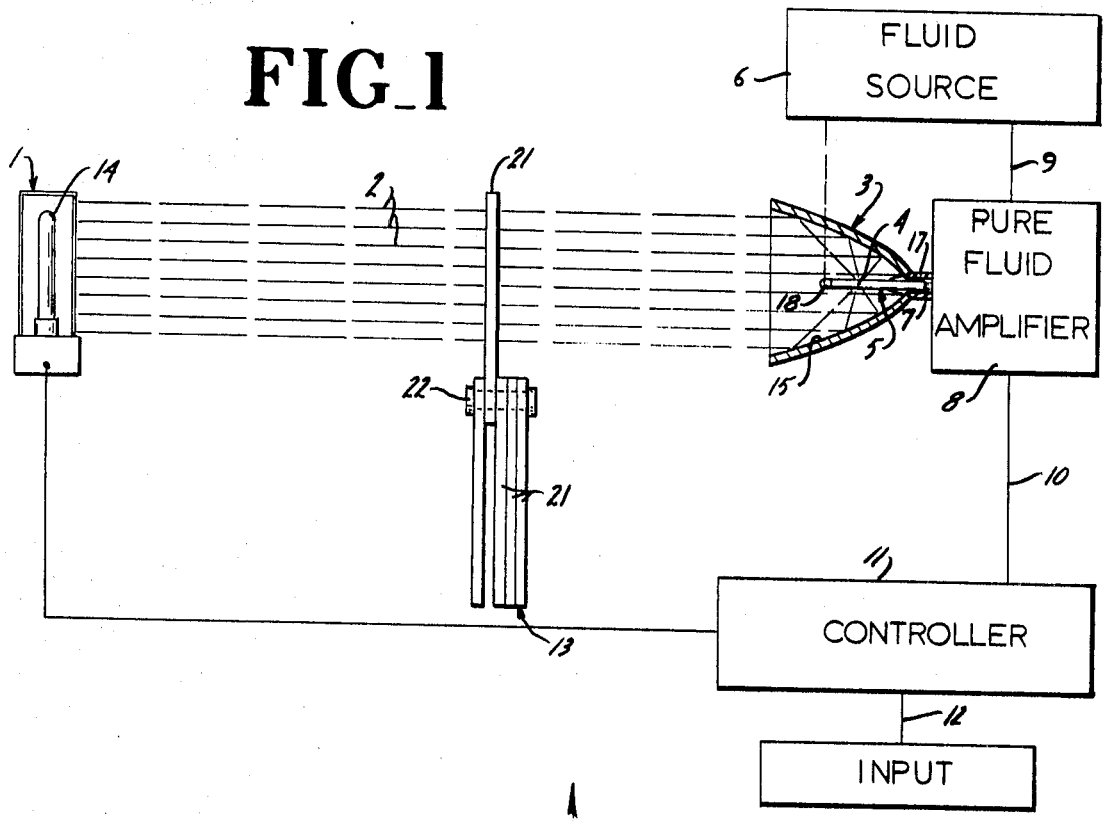

United States Patent

[11] 3,591,809

| [72] | Inventors | Richard N. Laakaniemi<br>Milwaukee;<br>Paul H. Sorenson, New Berlin, both of, Wis. |
|------|-----------|---|
| [21] | Appl. No. | 793,997 |
| [22] | Filed | Jan. 27, 1969 |
| [45] | Patented | July 6, 1971 |
| [73] | Assignee | Johnson Service Company<br>Milwaukee, Wis. |

[54] FLUIDIC RADIATION SENSOR VARYING THE VISCOSITY OF A FLUID STREAM
10 Claims, 2 Drawing Figs.

[52] U.S. Cl. .................................................. 250/83 R,
137/81.5, 235/201 FS, 250/43.5 R, 250/83.3 H
[51] Int. Cl. ..................................................... G01j 5/38
[50] Field of Search........................................... 250/83.3,
83, 43.5; 137/81.5; 235/201

[56] References Cited
UNITED STATES PATENTS

| 2,605,426 | 7/1952 | Martin | 250/43.5 |
|-----------|--------|--------|----------|
| 3,228,411 | 1/1966 | Straub | 137/81.5 |
| 3,234,380 | 2/1966 | Liston et al. | 250/83.3 IR X |

Primary Examiner—James W. Lawrence
Assistant Examiner—Morton J. Frome
Attorney—Andrus, Sceales, Starke and Sawall ABSTRACT: This disclosure includes a fluidic sensor establishing a fluid signal related to the level of radiant energy impressed on the sensor. The sensor is a capillary tube mounted at the focal point of a reflector into which the radiant energy field is directed. The output of the capillary tube is a signal stream related to the temperature of the tube. The output is connected to a fluid amplifier. A filter is shown between the source of radiant energy and the reflector to select the frequency or frequency band within the total radiation spectrum which is passed from the source to the reflector.

PATENTED JUL 6 1971

3,591,809

INVENTORS
RICHARD N. LAAKANIEMI
BY PAUL H. SORENSON

Attorneys

FLUIDIC RADIATION SENSOR VARYING THE VISCOSITY OF A FLUID STREAM

This invention relates to a fluidic radiation sensor and particularly to a sensor which establishes a fluidic output signal which is related to the level of a radiation energy field.

Generally, radiant energy is analyzed in accordance with the wave theory and is generally identified as electromagnetic waves or energy. Radiation energy includes a substantial range of different wavelengths or frequencies generally identified as the radiation spectrum. The relatively short wavelengths are within the visible spectrum, and the longer wavelengths within the infrared spectrum.

In many applications involving radiant energy, the detection and measurement of the level of the radiant energy of a given field becomes significant. Various radiant energy transducers have been suggested for detecting the level of the radiant energy and establishing an electrical signal related to the energy level. Thus, pyrometers employing thermocouples or a plurality of thermocouples forming a thermopile have been employed in combination with means for concentration of the radiant energy on the thermal junctions. Phototubes, selinium barrier layer cells, infrared sensors and the like have also been generally employed in detecting radiant energy.

The present invention is particularly directed to a sensor employing a fluidic device to directly establish a fluid signal which is related to the level of the radiation energy. The output of the device may therefore be directly interconnected as a part of a fluidic system for controlling, detecting or otherwise operating a system in accordance with a radiant energy characteristic. Generally, in accordance with the present invention, a fluid resistor means, preferably a capillary tube, is interconnected to the input of a fluidic signal detecting means. A radiant energy concentrating means such as a lens or reflector directs the radiant energy field onto the resistor means. The output of the resistor means is directly related to its temperature and consequently the output of the fluid resistor means directly provides a fluid signal stream related to the focused radiant energy.

By employing a filter means between the source and the concentrating means, the output can be made selective to a given frequency or frequency band within the total radiation spectrum.

The fluid signal stream is applied to a fluid amplifier, such as the impact modulator devices shown in U.S. Pat. No. 3,388,713 and provides a high pressure fluid signal related to the focused radiant energy pressure fluid signal related to the focused radiant energy which can be interconnected actuate fluid driven operators. For example, the amplifier output can be interconnected into a servo system to operate the radiation source and control the level of the radiant energy field. For example, it can also be employed to detect the presence or motion of a body within the radiant energy field and through a servosystem cause a radiant energy source to follow the body moving within the radiant energy field or to maintain a predetermined relationship with respect thereto.

The drawing furnished herewith illustrates the best mode presently contemplated by the inventor for carrying out the present invention and clearly discloses the above advantages and features as well as others which will be readily understood from the following description.

Figure 2:
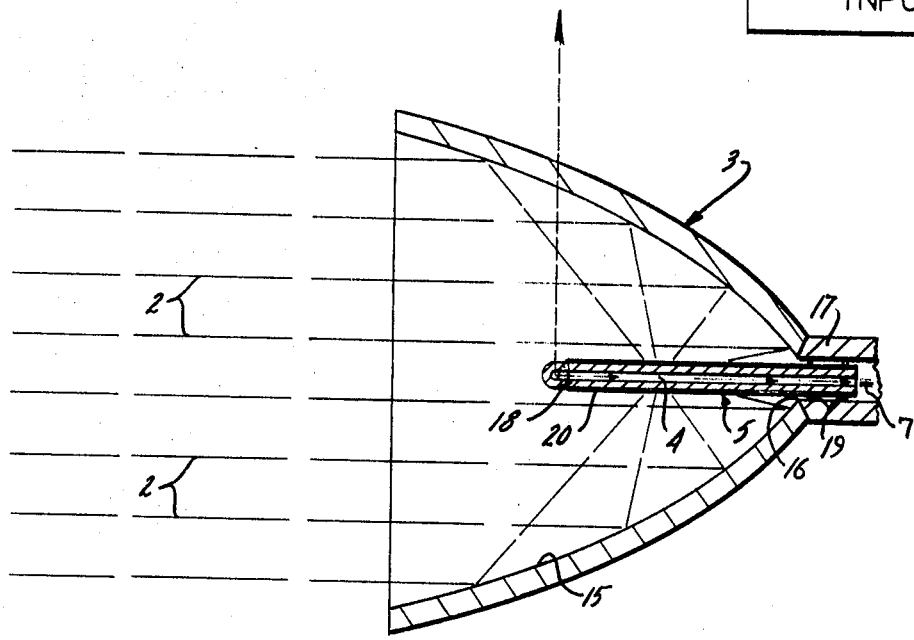

In the drawing:

FIG. 1 is a schematic diagram of a pure fluid detecting and radiant energy control system incorporating and illustrating one embodiment of the present invention; and FIG. 2 is an enlarged view of a portion of FIG. 1 more clearly showing details of the energy transducer.

Referring to the drawing, a radiant energy source 1 emits a radiant energy field, shown diagrammatically by the energy wave lines 2. A focusing unit 3 is mounted in spaced relation to the source 1 to intercept the wave lines 2 and direct the energy to a focal area or point 4. A fluidic resistor transducer unit 5 is mounted at the focal point 4 and is constructed to absorb the concentrated energy of the field 2. The transducer unit 5 is further constructed to modulate the flow through it in accordance with the temperature of the unit. In the illustrated embodiment of the invention, a fluid source 6 of air or other fluid is connected to the one end of the resistor transducer unit 5 and establishes a signal stream 7 in accordance with a modulating effect of the resistor unit 5. The output of the resistor unit 5 is in turn connected to a fluid signal sensor 8 with stream 7 defining a control stream input. The sensor 8 is shown interconnected via a fluid supply line 9 to the source 6 and having a fluid output line 10. The supply line 9 establishes a relatively high pressure signal to establish a corresponding output which is dependent upon the pressure of the main fluid signal applied by the supply line 9 and the modulating effect of the signal stream 7. The output signal at fluid output 10 is therefore an amplified signal related to stream 7 and in FIG. 1 is interconnected through a servocontrol unit 11 to control the output of the radiation source 1, for purposes of illustration and explanation. The servocontrol unit 11 includes a setpoint input line 12. The unit 11 operates in accordance with well known servo theory to continuously regulate the output of the radiation source 1 until the signal at output line 10 corresponds to the input at setpoint line 12.

In FIG. 1, a filter unit 13 is shown disposed between the source 1 and the focusing unit 3 and is constructed to selectively pass radiation such that the resistor unit 5 is only subjected to the radiation energy which is passed by the particular filter.

In operation, the radiant energy of field 2 is focused upon the resistor unit 5. The strength of the signal stream 7 is directly related to the temperature level of the resistor unit 5 and thus to the energy of field 2. The related signal stream 7 is amplified by the sensor 8 and provides an operating pressure signal which is supplied to the control unit 11 to adjust the output of the radiation source 1 until such time as the fluid output signal and the setpoint signal appearing at setpoint line 12 are in a predetermined balanced relationship.

The radiation source 1 may, of course, be of any suitable construction. In the drawing, source 1 is shown including a high intensity incandescent lamp 14. The output of the lamp 14 is generally a field directed toward the focusing unit 13.

In the illustrated embodiment of the invention, the focusing unit 13 is shown as a reflector having an inner parabolic mirror 15 intercepting the energy field lines 2. The focusing unit 3 could obviously be a lens or any other suitable means for concentrating of the radiant energy field 2 onto the limited or concentrated area or point.

The apex or tip of the parabolic mirror 15 is removed to define an axial opening 16. A coupling and support 17 is connected to the exterior tip of the reflector and supports the sensor 8 in alignment with the apex of the reflector 3.

The resistor unit 5 which may be an orifice or other flow restriction means is preferably a capillary tube 18 or the like which establishes a laminar flow region. The tube 18 is constructed to establish a high thermal absorption characteristic so as to transmit the thermal energy to the fluid stream. The capillary tube 18 may advantageously be constructed as a linear device in accordance with the teaching of the article "Fluidic Resistors" by Paul H. Sorenson et al. published in the Apr. 1968 issue of *Fluidics Quarterly*. The capillary tube 18 is mounted coaxially of the mirror 15 and the support pipe 17. The resistor tube 18 extends through the focal point 4 and into pipe 17 and is attached by a plurality of thermal insulating struts 19 to the pipe 17. The outer surface of the capillary tube 18 is covered with a black surface coating 20 such as carbon black or pyrolytic graphite to increase the thermal absorption characteristics of the capillary tube. The black surface may advantageously be applied to the inner surface of a tube which transmits the radiant energy radially to the black surface. Further, the resistor unit may also include a porous flow element formed of an appropriate radiant energy absorbing material.

The resistance of the capillary tube 18 is dependent upon its length and diameter and also upon the temperature of the tube 18. Generally, the viscosity increases with temperature for gases and decreases with temperature for liquids. The resistance varies directly with the viscosity. Therefore with air, as the temperature of tube 18 increases, the resistance increases and the flow of the stream 7 decreases. Conversely, reducing of the temperature of the capillary tube 18 increases the flow of an airstream 7.

The output of the tube 18 defines the signal stream 7 which is directed into the fluid signal sensor 8. Although not described or shown in detail, the fluid sensor 8 can advantageously be a summing impact modulator interconnected as a part of a suitable receiving controller to produce a high pressure fluid signal; for example, as shown in U.S. Pat. No. 3,388,713.

In the illustrated embodiment of the invention, the filter assembly 13 includes a pack of individual photographic filter elements 21 interconnected by a pivotal connector 22. The filter elements 21 are selectively pivoted to intercept the radiant energy 2 from the source 1. As is well known, the filter elements when interposed will selectively pass and block radiation energy frequencies or frequency bands and thereby vary the radiant energy level applied to the input side of the focusing unit 3. For example, by successively inserting yellow, red, green and violet photographic filter elements 21 between the source 1 and the focusing unit 3, the temperature of the capillary tube 18 was successively reduced. The output was correspondingly reduced in steps and therefore related to the filter color. By suitable calibration, the output may provide a means for identifying the filter characteristic.

Thus, the fluid resistor unit 5 mounted at the concentrated energy point of a focusing or other concentrating unit 3 provides a direct radiant energy to fluid energy transducer and provides a fluid signal stream which can through interconnection with pure fluid detecting and amplifying devices provide an operating fluid output signal.

The fluid output signal can of course be employed in any system requiring a fluid input signal. For example, an alarm or signaling means may be connected to the output to broadly detect the presence of radiation or by the use of a filter means, selected radiation frequencies or bands. By interconnecting of the fluidic output in a servo or control system as shown in the drawing, the output signal can be interconnected to control the radiation level in a given area, either by directly controlling the energization of the radiation source 1 or controlling a shutter or other filter type unit interposed between the source 1 and the area to be controlled.

The presence or motion of an opaque, translucent or reflective body within a radiant energy field will result in a variation in the concentration of the energy with respect to the focusing unit. Consequently, the system can also be employed to detect the presence and movements of such body. For example, opaque or translucent bodies passing through the path of the energy field will intercept and change the energy transmitted. Reflective bodies can be similarly detected by the concept of reflecting of the energy source onto the receiver such that the interposition of a reflective body will change the reflective energy. The output signal may be employed to actuate a suitable alarm and can further control the source to maintain the source in a predetermined relationship with respect to the body as it is positioned within or moves through an area.

Although the resistor means is shown connected to a separate fluid source, the resistor means and sensor may be constructed such that the control signal stream flows from the sensors through the resistor means. The resistor means would then control the upstream pressure of the control signal stream in the sensor and similarly provide an indication of the strength of the concentrated radiant energy.

The present invention thus provides a means for directly sensing and converting the radiation energy to a fluid signal which can be employed directly in fluidic control systems.

We claim:

1. A fluidic radiation sensor comprising energy concentrating means having an input means for receiving an incoming radiant energy field and directing said energy into a given area, a fluid resistor means comprising a capillary tube means having a fluid stream passageway means conducting a fluid stream between an inlet and an outlet and establishing an output signal stream from said outlet and mounted in said given area, said resistor means being constructed to absorb radiant energy and vary the viscosity of said fluid stream in said stream passageway and thereby the strength of the output signal stream in accordance with said absorbed radiant energy, and detection means to detect said output signal stream and thereby detect the level of said radiant energy field.

2. The fluidic radiation sensor of claim 1 wherein said fluid resistor means is a laminar flow means of a radiant energy absorbing construction.

3. The fluidic radiation sensor of claim 1 wherein said capillary tube means is made of a material for absorbing radiant energy and having an outer black surface.

4. The fluidic radiation sensor of claim 1 wherein detection means include a fluidic amplifier having input means connected to said fluid resistor means and an output stream coupled to and modulated by said signal stream.

5. The fluidic radiation sensor of claim 1 wherein said focusing means concentrates the energy to a focal point and said fluid resistor means is mounted at said focal point.

6. The fluidic radiation sensor of claim 1 wherein said focusing means concentrates the energy to a focal point, said capillary tube means is mounted at said focal point, and said detection means is a fluidic amplifier establishing a high pressure fluid output signal proportional to the strength of the signal stream.

7. The fluidic radiation sensor of claim 1 having a radiant energy filter means interposed between the concentrating means and the source of radiant energy to pass only radiation of a selected frequency or frequencies.

8. The fluidic radiation sensor of claim 1 having a radiant energy filter means to pass only radiation of a selected frequency or frequencies, and said detection means is a fluidic amplifier establishing a high pressure fluid signal proportional to the strength of the signal stream.

9. The fluidic radiation sensor of claim 1 having a plurality of radiant energy filter means individually positioned within said energy field to selectively pass radiation of a different frequency, the output of said fluid resistor means being related to the particular frequency impressed on the concentrating means whereby said detection means establishes an output signal indicative of the particular filter means interposed within said energy field.

10. The fluidic radiation sensor of claim 1 having a controllable radiation source establishing the radiant energy field and wherein said detection means is a fluidic amplifier establishing a high pressure fluid output signal proportional to the strength of said output signal stream, and a fluid actuated controller connected to said detection means and said controllable radiation source to vary the intensity of the radiant energy field impressed upon said energy concentrating means in accordance with the strength of said signal stream.